C. A. PARSONS AND S. S. COOK.
METHOD OF FORMING GEAR TEETH.
APPLICATION FILED MAR. 30, 1920.
1,401,550.
Patented Dec. 27, 1921.
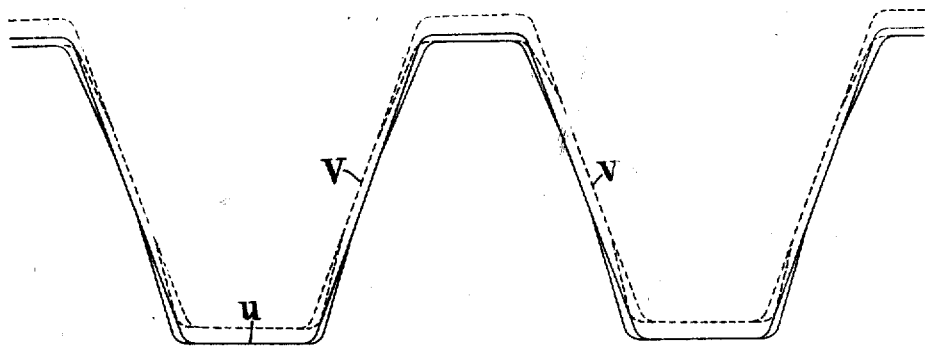

UNITED STATES PATENT OFFICE.

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

METHOD OF FORMING GEAR-TEETH.

1,401,550.   Specification of Letters Patent.   Patented Dec. 27, 1921.

Original application filed May 15, 1918, Serial No. 234,857. Divided and this application filed March 30, 1920. Serial No. 369,967.

*To all whom it may concern:*

Be it known that we, CHARLES ALGERNON PARSONS and STANLEY SMITH COOK, both subjects of the King of Great Britain and Ireland, residing at Heaton Works, Newcastle-upon-Tyne, in the county of Northumberland, and Turbinia Works, Wallsend-on-Tyne, in the county of Northumberland, England, respectively, have invented certain new and useful Improvements in a Method of Forming Gear-Teeth, of which the following is a specification.

The present invention relates to the formation of the teeth of gears for power transmission and has for its object a method of constructing gears with teeth of such form that under the designed conditions of power transmission the transmitted force will be substantially uniformly distributed across each of the faces of interengaging gear pairs.

Gear wheels in which these conditions are fulfilled are described in our Patent No. 1,351,401, filed May 15, 1918, as application Serial Number 234,827 and of which the present application is a division. In these wheels the depth of the slot between consecutive teeth varies across the face of the pinion, being of a greater depth at the end of the pinion nearer to the point at which the driving torque is applied than at the other end.

The accompanying drawing is a diagram showing the correction applied according to the invention.

In the construction of gears for transmission of large powers the teeth are usually formed by the generating process in which a hob is used having cutting teeth with straight sided flanks and a slight outward taper, as shown in the drawing, so that an increase $u$ in the depth of penetration of the hob into the work causes a decrease $2v$ in the thickness of the teeth cut on the blank measured at a given distance from the axis of the work, for instance, at the pitch circle.

The present invention consists in machining the teeth of gears to a form which gives more uniform distribution of force across the face of the gear for given power conditions, by varying the position of the generating hob in relation to the axis of the work as it is fed across the work.

The invention also consists in varying the radial depth of penetration into the work of the hob generating the gear teeth so that the gear teeth formed on the work piece will take the form required to give a substantially uniform distribution of force per unit width of gear under the designed conditions of transmission.

The invention further consists in obtaining the desired correction by setting the usual straight slide along which the generating hob is moved by the feed screw at a slight angle to the axis of the work piece being cut, so that the radial depth of penetration of the hob into the work uniformly increases or decreases as it is fed across the face of the gear blank, the greatest penetration into the work piece being at the end of the pinion at which the torque is applied.

The invention also consists in the improved method of forming gear teeth herein described.

In carrying the invention into effect according to one example, I therefore incline the straight slide along which the generating hob in a machine for hobbing gear teeth is moved by the feed screw so that it makes a slight angle with the axis of the work, or I incline the work so that its axis makes the slight angle with the hob slide, this angle corresponding to the inclination of the curve of deflection due to torsion and bending across the face of the teeth. The setting of the slide will usually be inclined at different angles in cutting the two parts of the double helical gear, the result being to obtain greater penetration into the work piece at one end of the pinion, usually the end at which the torque is applied.

It will be seen that this method of carrying out the correction is extremely simple and is capable of very accurate adjustment and with such a correction almost perfectly uniform distribution is obtained, because in addition to obtaining the close approximation to the teeth formation required for perfectly uniform distribution, the flexibility of both sets of teeth and the oil film between their interengaging faces tend to reduce the remaining unevenness of distribution.

In the case I have described the depth of penetration of the hob is decreased in the same direction for each half of the pinion, but in cases in which the torque is applied between the halves of the pinion the decrease will be in opposite directions on the two halves.

The teeth generated for reduction gearing are usually involute, the flanks of the generating hob teeth in longitudinal section being straight-sided. It will be seen, therefore, that in such cases variation in the depth of penetration will not affect the exactness of the shape of the teeth but will only affect their thickness.

Having now described our invention what we claim as new and desire to secure by Letters Patent is:—

1. The method of forming gear teeth which consists in machining the teeth to a form which gives more uniform distribution of force across the face of the gear for given power conditions, by causing the generating hob uniformly to approach or recede from the axis of the work as it is fed across the work, as set forth.

2. In a method of forming gear teeth, varying the radial depth of penetration into the work of the hob generating the gear teeth so that the gear teeth formed on the workpiece will take the form required to give a substantially uniform distribution of force per unit width of gear under the designed conditions of transmission, as set forth.

3. A method of forming gear teeth which consists in setting the usual straight slide along which the generating hob is moved by the feed screw at a slight angle to the axis of the workpiece being cut so that the radial depth of penetration of the hob into the work uniformly increases or decreases as it is fed across the face of the gear blank, the greatest penetration into the workpiece being at the end of the pinion at which the torque is applied, as set forth.

In testimony whereof we have signed our names to this specification.

CHARLES ALGERNON PARSONS.
STANLEY SMITH COOK.